(12) United States Patent
Barefoot

(10) Patent No.: US 9,033,641 B1
(45) Date of Patent: May 19, 2015

(54) CARRIER SYSTEM FOR ELECTRIC SCOOTERS

(76) Inventor: Glenn R. Barefoot, Addison, PA (US)

( * ) Notice: Subject to any disclaimer, the term of this patent is extended or adjusted under 35 U.S.C. 154(b) by 603 days.

(21) Appl. No.: 13/415,007

(22) Filed: Mar. 8, 2012

(51) Int. Cl.
*B60P 3/06* (2006.01)
*B60R 9/06* (2006.01)

(52) U.S. Cl.
CPC .... *B60P 3/06* (2013.01); *B60R 9/06* (2013.01)

(58) Field of Classification Search
CPC ........................................................ B60P 3/06
USPC .......... 224/499, 504, 506, 509, 519; 414/462, 414/921
See application file for complete search history.

(56) References Cited

U.S. PATENT DOCUMENTS

| | | | | |
|---|---|---|---|---|
| 4,213,729 A | * | 7/1980 | Cowles et al. ................ | 414/462 |
| 4,234,284 A | * | 11/1980 | Hauff ............................ | 414/462 |
| 4,705,448 A | * | 11/1987 | Mungons ...................... | 414/462 |
| 4,934,894 A | * | 6/1990 | White .......................... | 414/462 |
| 5,011,361 A | | 4/1991 | Peterson | |
| 5,676,292 A | * | 10/1997 | Miller .......................... | 224/524 |
| 5,816,763 A | | 10/1998 | Hamann et al. | |
| 5,853,278 A | | 12/1998 | Frantz | |
| 5,938,395 A | * | 8/1999 | Dumont, Jr. .................. | 414/462 |
| 6,139,247 A | * | 10/2000 | Wright .......................... | 414/462 |
| D435,495 S | | 12/2000 | McCoy et al. | |
| 6,253,981 B1 | | 7/2001 | McLemore | |
| 6,435,801 B2 | * | 8/2002 | Talbott .......................... | 414/462 |
| 6,502,730 B2 | * | 1/2003 | Johnson ........................ | 224/519 |
| 6,783,315 B1 | | 8/2004 | Senechal | |
| 6,887,027 B2 | | 5/2005 | O'Leary et al. | |
| 6,976,615 B2 | * | 12/2005 | Dean ............................ | 224/405 |
| 7,097,408 B2 | * | 8/2006 | Paxton .......................... | 414/462 |
| 7,246,733 B2 | | 7/2007 | Threet et al. | |
| 7,316,339 B2 | | 1/2008 | Zhang | |
| 7,686,562 B2 | * | 3/2010 | Panzarella et al. ............ | 414/462 |
| 7,811,045 B2 | * | 10/2010 | Butta ............................ | 414/462 |
| 7,841,821 B2 | * | 11/2010 | Miro et al. .................... | 414/462 |
| 8,911,195 B2 | * | 12/2014 | Derrick et al. ................ | 414/462 |
| 2008/0044269 A1 | | 2/2008 | Pradenas | |
| 2008/0206030 A1 | * | 8/2008 | Reuille et al. ................ | 414/462 |

\* cited by examiner

*Primary Examiner* — James Keenan

(57) ABSTRACT

A carrier system for transporting an electric scooter behind a vehicle with a hitch receiver having a base platform, an extension ramp removably attached to a side edge of the base platform at an angle with respect to the base platform via a first attachment means, a base support tube where the base platform is mounted atop of, a hitch tube adapted to be telescopically received in a hitch receiver of a vehicle, wherein when the hitch tube is engaged with the base support tube and the tubes are secured together via a pivot bolt, the base support tube can pivot between a storage position and an extended position.

12 Claims, 8 Drawing Sheets

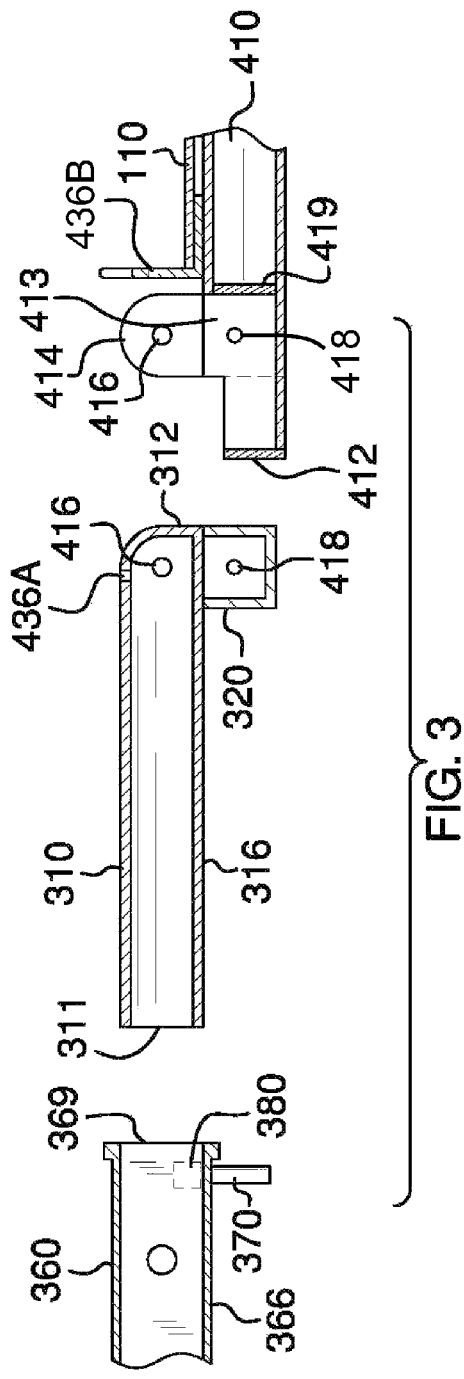
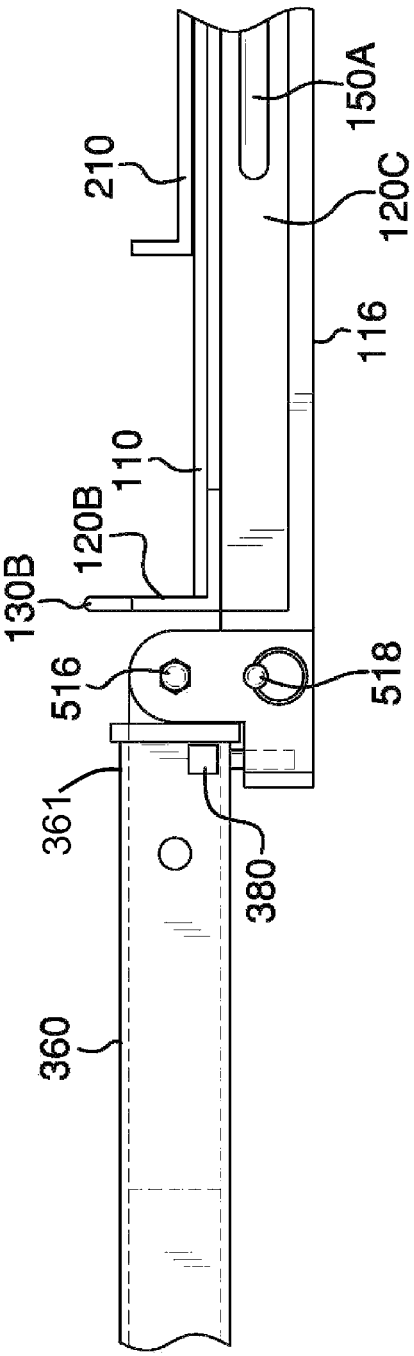
FIG. 3
FIG. 4

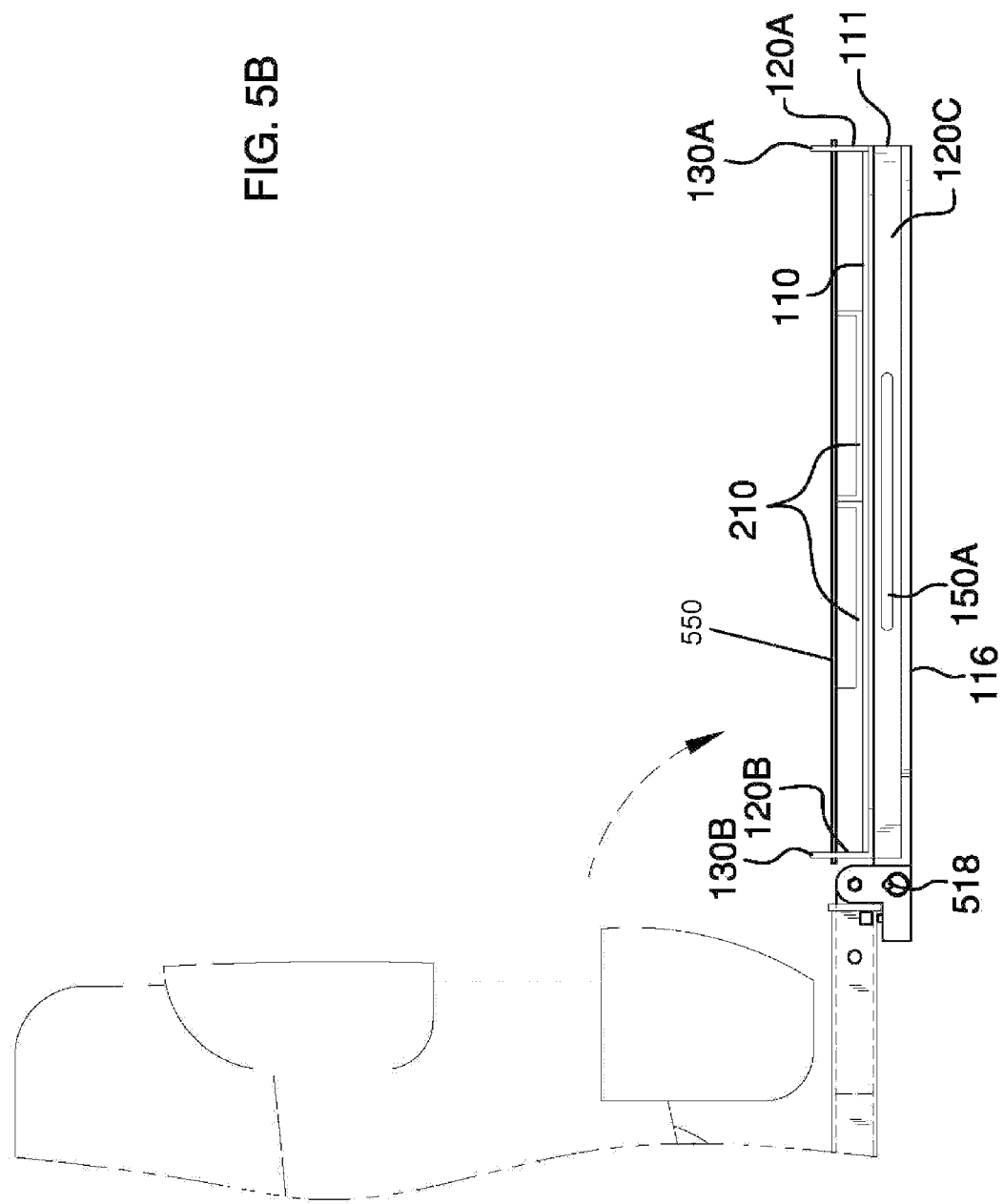

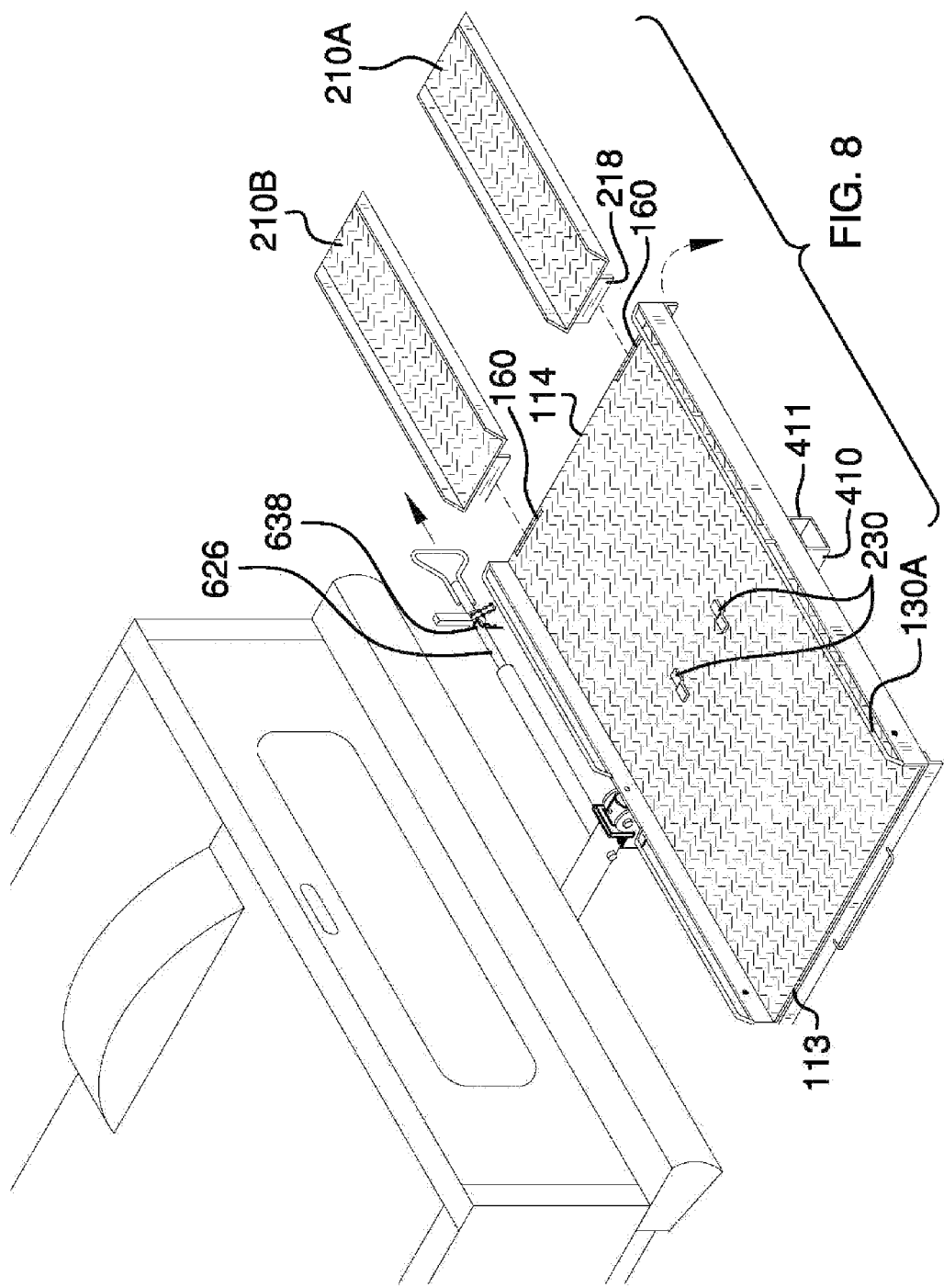

CARRIER SYSTEM FOR ELECTRIC SCOOTERS

FIELD OF THE INVENTION

The present invention is directed to a vehicle accessory for transporting electric scooters, more particularly to a carrier system engaged in a vehicle's hitch receiver for transporting electric scooters.

BACKGROUND OF THE INVENTION

Electric scooters for handicapped individuals are bulky and difficult to transport. The present invention features a carrier system for electric scooters. The system engages the vehicle's hitch receiver, thus allowing a user to easily load and transport an electric scooter at the back of the vehicle. The system of the present invention helps free up cargo space and seating in the interior of the vehicle.

SUMMARY

The present invention features a carrier system for electric scooters. In some embodiments, the carrier system for transporting an electric scooter behind a vehicle with a hitch receiver comprises a base platform having a first side edge, a second side edge opposite the first side edge, a third side edge, a fourth side edge, a top surface and a bottom surface; an extension ramp removably attached to the third side edge of the base platform at an angle with respect to the base platform via a first attachment means; a base support tube having a first end and a second end, the base platform is mounted atop the base support tube wherein the first end of the base support tube faces the first side edge of the base platform and the second end of the base support tube extends past the second side edge of the base platform, the second end of the base support tube has a bottom surface and two side walls and an open top surface, wherein a pair of lockdown pin holes is disposed in the side walls of the second end of the base support tube, the lockdown pin holes are adapted to accommodate a lockdown pin, a pair of side wall lips extend upwardly from the side walls of the second end of the base support tube, a pair of pivot holes is disposed in the side wall lips, the pivot holes are adapted to accommodate a pivot bolt; a hitch tube having a first end, a second end, a top surface, a bottom surface, and side surfaces, the hitch tube has a cylindrical cross section, the first end of the hitch tube is adapted to be telescopically received in a hitch receiver of a vehicle, the second end of the hitch tube is adapted to be sandwiched between the side wall lips, a pair of pivot holes is disposed in the second end of the hitch tube, the pivot holes in the hitch tube, align with the pivot holes of the side wall lips of the base support tube, the tubes, can be secured together via a pivot bolt in the pivot holes; a lockdown pin flange extending downwardly from the bottom surface of the hitch tube at the second end, the lockdown pin flange is adapted to be sandwiched between the side walls of the second end of the base support tube, a pair of lockdown pin holes is disposed in the lockdown pin flange and the lockdown pin holes in the lockdown pin flange align with the lockdown pin holes of the side walls of the second end of the base support tube, wherein when the hitch tube is engaged with the base support tube and the tubes are secured together via a pivot bolt, the base support tube can pivot between a storage position wherein the base support tube is pivoted to an angle less than about 180 degrees with respect to the hitch tube and an extended position wherein the base support tube at an angle of about 180 degrees with respect to the hitch tube, wherein the hitch tube can rotate in a first direction and a second direction within the hitch receiver allowing the base platform to effectively pivot; a hitch stud extending downwardly from a bottom surface of an outer end of the hitch receiver, the hitch stud is adapted to be positioned in between the side walls of the second end of the base support tube when the base support tube is in the extended position, the hitch stud functions to limit rotation of the hitch tube in the first direction and in the second direction; and a first lock pin hole disposed in the top surface of the hitch tube at the second end and a second lock pin hole disposed in the second lip of the platform, the lock pin holes are adapted to receive a lock pin, wherein when the system is in the storage position the first and second lock pin holes align.

In some embodiments, the system further comprises a first lip extending upwardly from the first side edge of the base platform and a second lip extending upwardly from the second side edge of the base platform.

In some embodiments, the system further comprises a first rail extending upwardly from the first lip and a second rail extending upwardly from the second lip. In some embodiments, the second rail is divided into a first half and a second half separated by a space. In some embodiments, the system further comprises a third lip extending downwardly from the third side edge of the base platform and a fourth lip extending downwardly from the third side edge of the base platform.

In some embodiments, the system further comprises a first handle disposed on the third side edge of the base platform or on a third lip extending downwardly from the third side edge of the base platform, a second handle disposed on the fourth side edge of the base platform or on a fourth lip extending downwardly from the third side edge of the base platform, or a combination thereof In some embodiments, the system further comprises a traction component disposed on the top surface of the base platform for providing traction. In some embodiments, the traction component comprises rubber footings, metal mesh, or a combination thereof.

In some embodiments, the first attachment means comprises a ramp slot disposed in the base platform at the third side edge and a tab disposed on an end of the extension ramp, wherein the tabs removably engage the ramp slot to attach the extension ramp to the base platform.

In some embodiments, the system further comprises a storage clip disposed on the top surface of the base platform, the storage clip removably engages the extension ramp to secure the extension ramp atop the base platform for storage purposes.

In some embodiments, the system further comprises a rotation stop block disposed on each side of the hitch receiver to help limit rotation of hitch tube within the hitch receiver.

In some embodiments, the system further comprises a hitch release attached to the hitch tube near the second end of the hitch tube. In some embodiments, the system further comprises one or more pin apertures disposed in the hitch release. In some embodiments, the system further comprises a hitch release mounting bracket is disposed on the hitch release at or near an outer end of the hitch release. In some embodiments, the system further comprises a chain disposed on the hitch release mounting bracket, the chain has a free end wherein a locking pin is disposed on the free end, the locking pin is adapted to engage the pin aperture in the hitch release.

Any feature or combination of features described herein are included within the scope of the present invention provided that the features included in any such combination are not mutually inconsistent as will be apparent from the context, this specification, and the knowledge of one of ordinary

BRIEF DESCRIPTION OF THE DRAWINGS

FIG. 3 is a detailed cross sectional view of components of the system of the present invention.

FIG. 4 is a detailed side view of components of the system of the present invention.

FIG. 5B is a side view of the system of, the present invention in the extended position.

FIG. 8 is an in-use view of the system of the present invention.

DESCRIPTION OF PREFERRED EMBODIMENTS

Figure 1:
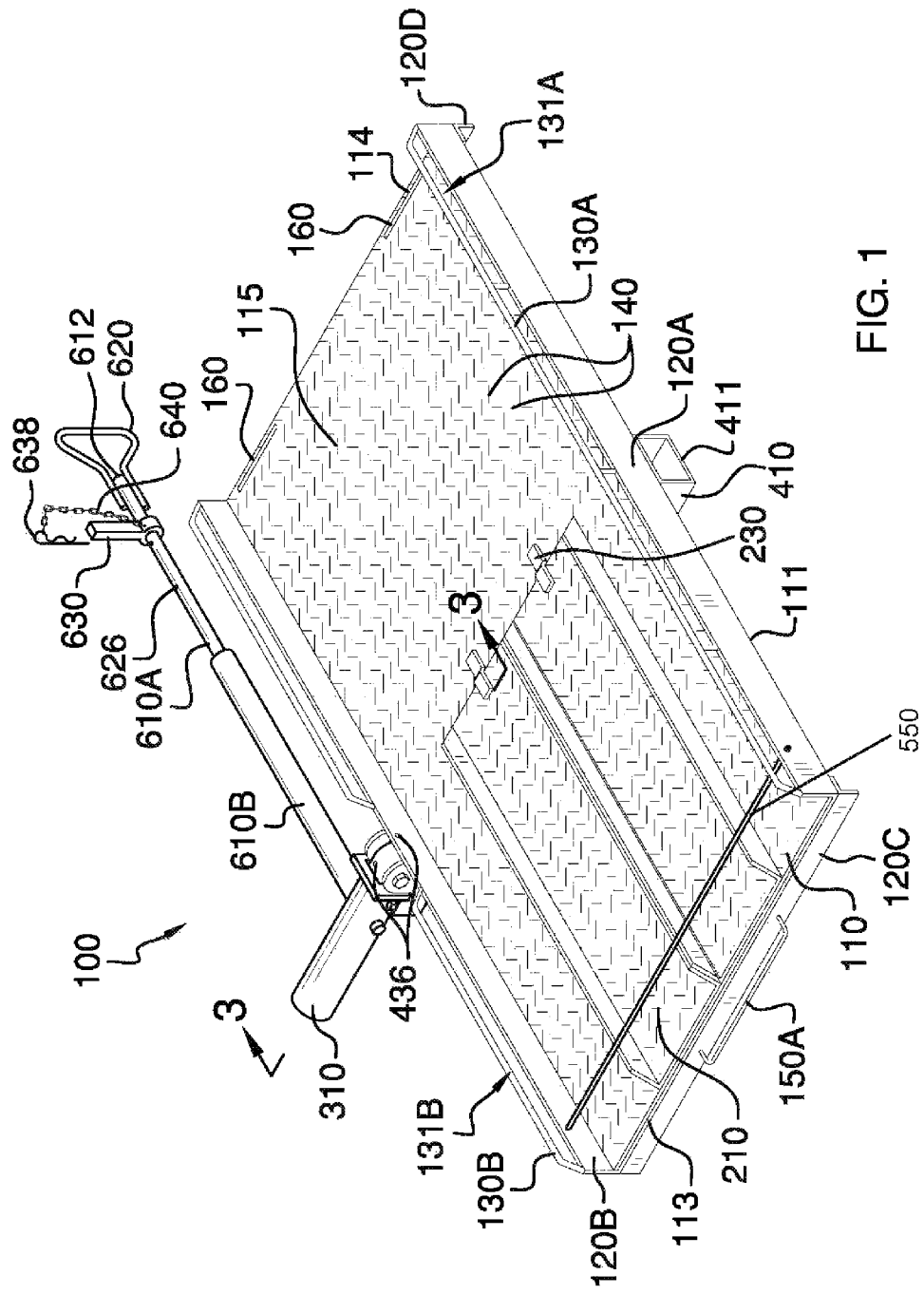
FIG. 1 is a perspective view of the system of the present invention.
Figure 2:
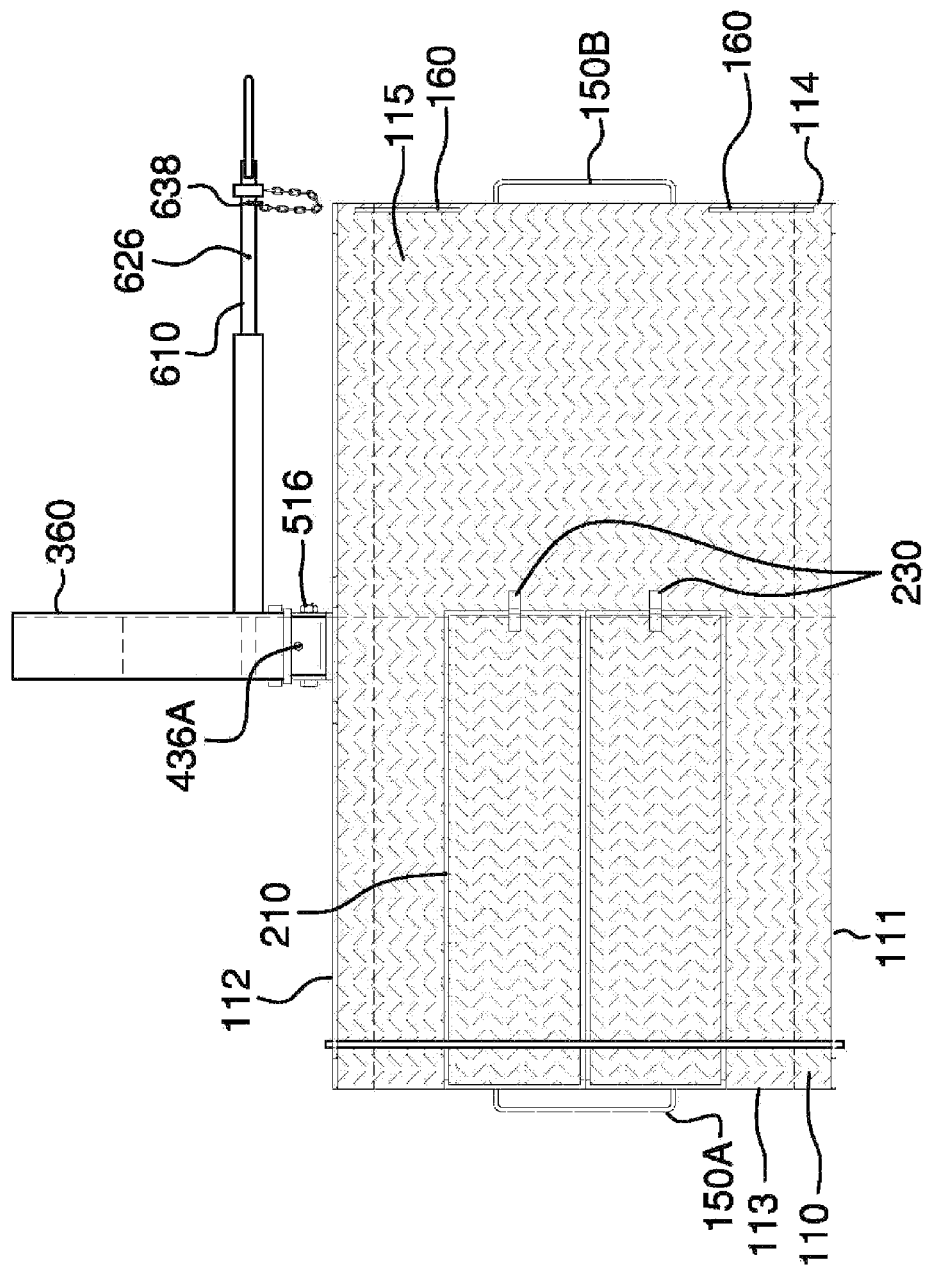
FIG. 2 is a top view of the system of the present invention.

Referring now to FIG. 1-8, the present invention features a carrier system 100 for an electric scooter 101. Without wishing to limit the present invention to any theory or mechanism, it is believed that the system 100 of the present invention is advantageous because it allows for pivoting of the base platform (in the first direction and the second direction) and the movement of the base platform between the storage and extended positions.

The system 100 comprises a base platform 110 having a first side edge 111, a second side edge 112 opposite the first side edge 111, a third side edge 113, a fourth side edge 114, a top surface 115 and a bottom surface 116.

In some embodiments, a first lip 120A (e.g., a raised side edge) extends upwardly from the first side edge 111 of the base platform 110 and a second lip 120B (e.g., a raised side edge) extends upwardly from the second side edge 112 of the base platform 110. In some embodiments, a first rail 130A extends upwardly from the first lip 120A. In some embodiments, a second rail 130B extends upwardly from the second lip 120B. The rails 130 may be used for tying down the scooter 101 (e.g., for engaging rope, bungee cords, etc.). As shown in FIG. 1, a first gap 131A is disposed in between the first lip 120A and the first rail 130A, wherein the first gap 130A can accommodate rope, bungee cords, etc., e.g., for tying town a scooter 101. A second gap 131B is disposed in between the second lip 120B and the second rail 130B, wherein the second gap 131B can accommodate rope, bungee cords, etc., e.g., for tying town a scooter 101. In some embodiments, the second rail 130B is divided into a first half and a second half separated by a space (where the hitch attachment components are located). The space may allow for the system 100 to fold more compactly when in the storage position (storage position shown in FIG. 5A). In some embodiments, the outer edges of the rails 130 are angled or beveled, as shown in FIG. 1.

In some embodiments, a third lip 120C extends downwardly from the third side edge 113 of the base platform 110. In some embodiments, a fourth lip 120D extends downwardly from the third side edge 113 of the base platform 110. In some embodiments, a first handle 150A is disposed on the third lip 120C or on the third side edge 113 of the base platform 110. In some embodiments, a second handle 150B is disposed on the fourth lip 120D or on the fourth side edge 114 of the base platform 110.

In some embodiments, a traction component 140 is disposed on the top surface 115 of the base platform 110 for providing traction. Traction components are well known to one of ordinary skill in the art. For example, in some embodiments, the traction component 140 comprises rubber footings. In some embodiments, the traction component 140 comprises metal mesh. The traction component 140 is not limited to the aforementioned materials or configurations.

As shown in FIG. 8, the system 100 further comprises an extension ramp 210 (or a pair of extension ramps, e.g., a first extension ramp 210A and a second extension ramp 210B. The extension ramp 210 (e.g., the first extension ramp 210A and the second extension ramp 210B can attach to the third side edge 113 or the fourth side edge 114 of the base platform 110, e.g., at an angle with respect to the base platform 110, via a first attachment means. The ramps 210 allow a scooter 101 to be driven up onto the base platform 110. In some embodiments, the first attachment means features a ramp slot 160 or a pair of ramp slots 160 disposed in the base platform 110 at the fourth side edge 114, wherein the extension ramps removably engage the ramp slots 160 (e.g., tabs 218 are disposed on an end of the extension ramps 210, wherein the tabs 218 engage the ramp slots 160, e.g., see FIG. 8). The first attachment means is not limited to a tab and slot mechanism. For example, in some embodiments, the first attachment means comprises a clip mechanism, a latch mechanism, etc.

In some embodiments, the extension ramp 210 can be stored atop the base platform 110, e.g., via a second attachment means for storage purposes. In some embodiments, the second attachment means comprises one or more storage clips 230 disposed on the top surface 115 of the base platform 110, wherein the storage clips 230 engage a side edge of the extension ramp 210. The storage clips 230 are arranged on the base platform 110 in an appropriate position to engage the extension ramp(s) 210.

As shown in FIG. 1 and FIG. 5B, in some embodiments, the system 100 further comprises a safety bar 550 (e.g., a safety rod) that extends from the first side edge 111 to the second side edge 112 near the third side edge 113 (or where the ramps are) of the base platform 110. The safety bar can help hold the ramps 210 in place.

The system 100 further comprises a base support tube 410. The base platform 110 is mounted atop the base support tube 410. The base support tube 410 has a first end 411 and a second end 412. The base support tube 410 extends from the second side edge 112 of the base platform 110 to at or near the first side edge 111, wherein the first end 411 of the base support tube 410 faces the first side edge 111 of the base platform 110. In some embodiments, the base support tube 410 has a square cross section, however the base support tube 410 is not limited to this configuration. The second end 412 of the base support tube 410 extends past the second side edge 112 of the base platform 110. In some embodiments, the second end 412 of the base support tube 410 is separated from the portion of the base support tube 410 under the base platform 110 by a separating plate 419 (e.g., see FIG. 3).

The second end 412 of the base support tube 410 has a bottom surface and two side walls 413 (e.g., the second end 412 of the base support tube 410 has a generally U-shaped cross section and lacks a top surface, e.g., the top surface is open). A pair of lockdown pin holes 418 is disposed in the side walls 413 of the second end 412 of the base support tube 410. The lockdown pin holes 418 are adapted to accommodate a lockdown pin 518, e.g., a ⅜ inch pin. The lockdown pin holes 418 are aligned with each other. The use of the lockdown pin holes 418 is optional.

Extending upwardly from the side walls 413 of the second end 412 of the base support tube 410 is a pair of side wall lips 414. In some embodiments, the side wall lips 414 have a curved top edge (e.g., see FIG. 3). A pair of pivot holes 416 is disposed in the side wall lips 414 (the pivot holes 416 are aligned with each other). The pivot holes 416 are adapted to accommodate a pivot bolt 516, e.g., a ⅝ inch bolt.

The system 100 further comprises a hitch tube 310 having a first end 311, a second end 312, a top surface, a bottom surface 316, and side surfaces. The hitch tube 310 has a cylindrical cross section. The first end 311 of the hitch tube 310 is adapted to engage a hitch receiver 360 of a vehicle (e.g., telescopically insert into the outer end 361 of the hitch receiver 360). In some embodiments, the hitch tube inserts about 8 inches, however the present invention is not limited to this distance and, configuration. Hitch receivers are well known to one of ordinary skill in the art. In some embodiments, the hitch tube 310 is about 2 inches in diameter, however the hitch tube 310 is not limited to this size and configuration.

The second end 312 of the hitch tube 310 is adapted to be sandwiched between the side wall lips 414. A pair of pivot holes 416 is disposed in the second end 312 of the hitch tube 310 (the pivot holes 416 are aligned with each other). The pivot holes 416 are oriented in the side surfaces of the hitch tube 310. The pivot holes 416 in the hitch tube 310 align with the pivot holes 416 of the side wall lips 414 of the base support tube 410. The pivot holes 416 are adapted to accommodate a pivot bolt 516, e.g. a ⅝ inch bolt.

Extending downwardly from the bottom surface 316 of the hitch tube 310 at the second end 312 is a lockdown pin flange 320. The lockdown pin flange 320 is adapted to be sandwiched between the side walls 413 of the second end 412 of the base support tube 410. A pair of lockdown pin holes 418 is disposed in the lockdown pin flange 320. The lockdown pin holes 418 in the lockdown pin flange 320 align with the lockdown pin holes 418 of the side walls 413 of the second end 412 of the base support tube 410. The lockdown pin holes 418 are adapted to accommodate a lockdown pin 518, e.g., a ⅜ inch pin. The use of the lockdown pin holes 418 is optional.

Figure 5A:
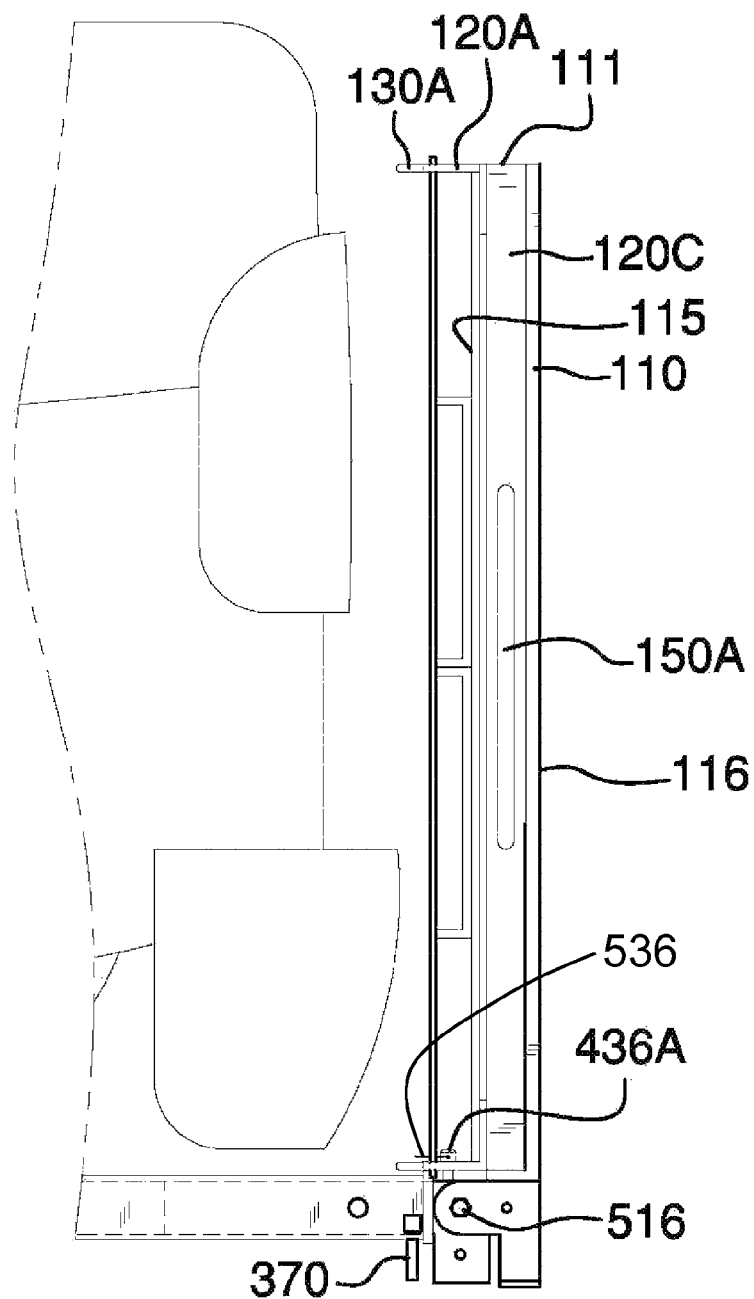
FIG. 5A is a side view of the system of the present invention in the storage position.

When the hitch tube 310 is engaged with the base support tube 410 (e.g., the second end 412) and the tubes 310, 410 are secured together via a pivot bolt 516 (and not the lockdown pin 518), the base support tube 410 can pivot between a storage position as shown in FIG. 5A (e.g., wherein the base support tube 410 is at an angle with respect to the hitch tube 310, e.g., about 90 degrees) and an extended position wherein the base support tube 410 is in line with the hitch tube 310 as shown in FIG. 4 and FIG. 5B (e.g., the angle is about 180 degrees). The lockdown pin 518 can be inserted into the lockdown pin holes 418 when the base support tube 410 is in the extended position. When the lockdown pin 518 is engaged in the lockdown pin holes 418, the base support tube 410 is secured in its position (e.g., either the storage position or the extended position). The use of the lockdown pin 518 is optional, for example the lockdown pin may be used for extra strength when driving on a bumpy road.

In some embodiments, a first lock pin hole 436A is disposed in the top surface of the hitch tube 310 at the second end 312. In some embodiments, a second lock pin hole 436B is disposed in the second lip 120B of the platform 110. When the system is in the storage position, the first and second lock pin holes 436 align. The lock pin holes 436 are adapted to receive a lock pin 536 (when the system is in the storage position) to secure the system in the storage position.

Figure 7:
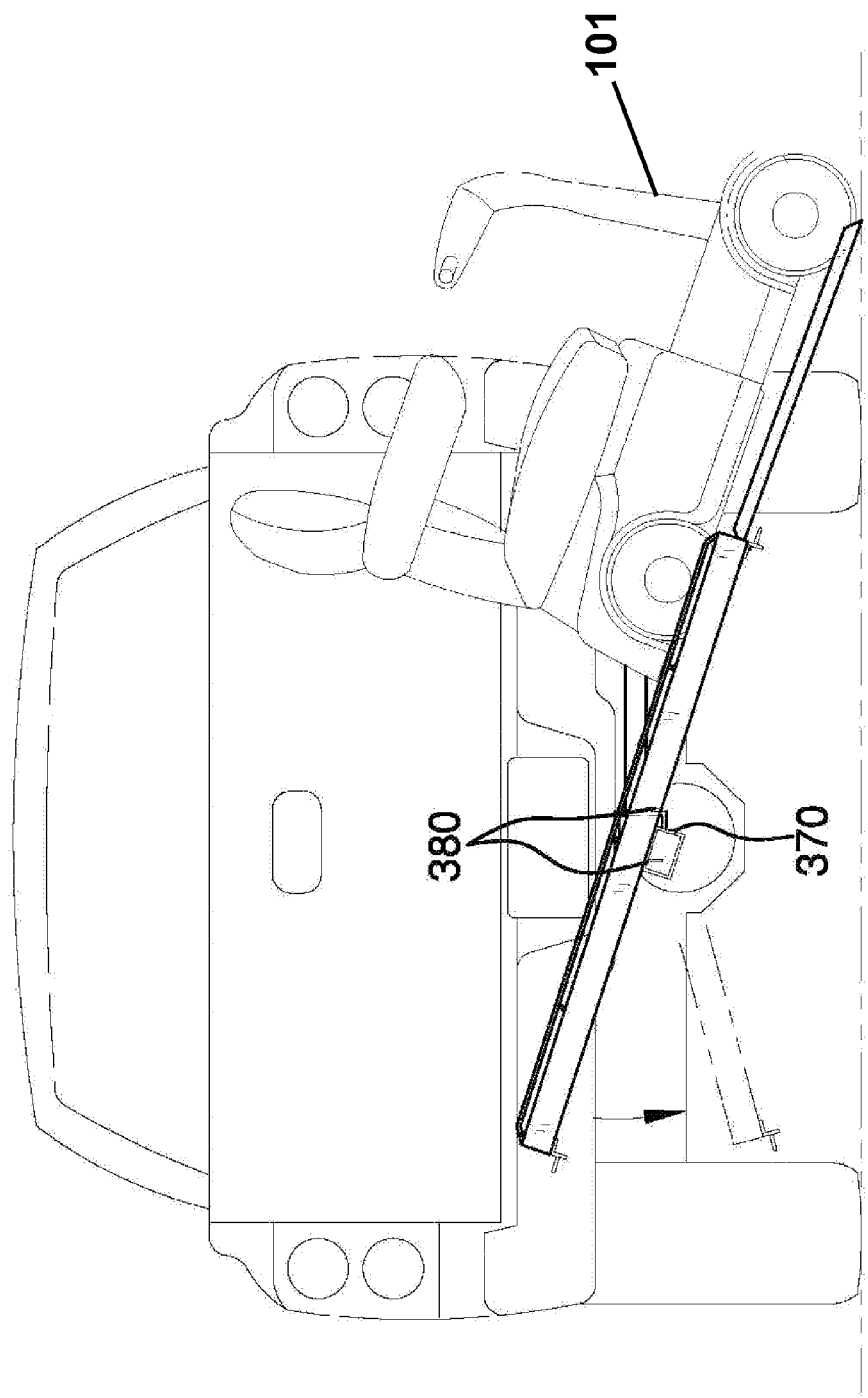
FIG. 7 is a rear in-use view of the system of the present invention.

As shown in FIG. 7, the system 100 (e.g., the base support tube 410 and the hitch tube 310) can rotate. For example, the hitch tube 310 can rotate in a first direction and a second direction within the hitch receiver 360, allowing the base platform 110 to effectively pivot with respect to the horizontal. As shown in FIG. 3, a hitch stud 370 extends downwardly from the bottom surface 366 of the outer end 361 of the hitch receiver 360. The hitch stud 370 is adapted to be positioned in between the side walls 413 of the second end 412 of the base support tube 410 when the base support tube 410 is in the extended position (e.g., see FIG. 4). In some embodiments, the hitch stud 370 functions to limit the amount of rotation of the hitch tube 310 in the first direction and/or in the second direction. For example, the hitch stud 370 contacts the side walls 413 once the hitch tube 310 has been rotated a certain amount. In the storage position as shown in FIG. 5A, the hitch stud 370 is not positioned in between the side wails 413 of the second end 412 of the base support tube 410. In some embodiments, the hitch stud 370 functions to help keep the platform 110 from slipping.

In some embodiments, a rotation stop block 380 is disposed on each side of the hitch receiver 360 to help limit rotation of the system 100.

To move the platform 110 and base support tube 410 between the storage and extended positions, a user can simply lift up or pull down the platform 110 in place.

Figure 6:
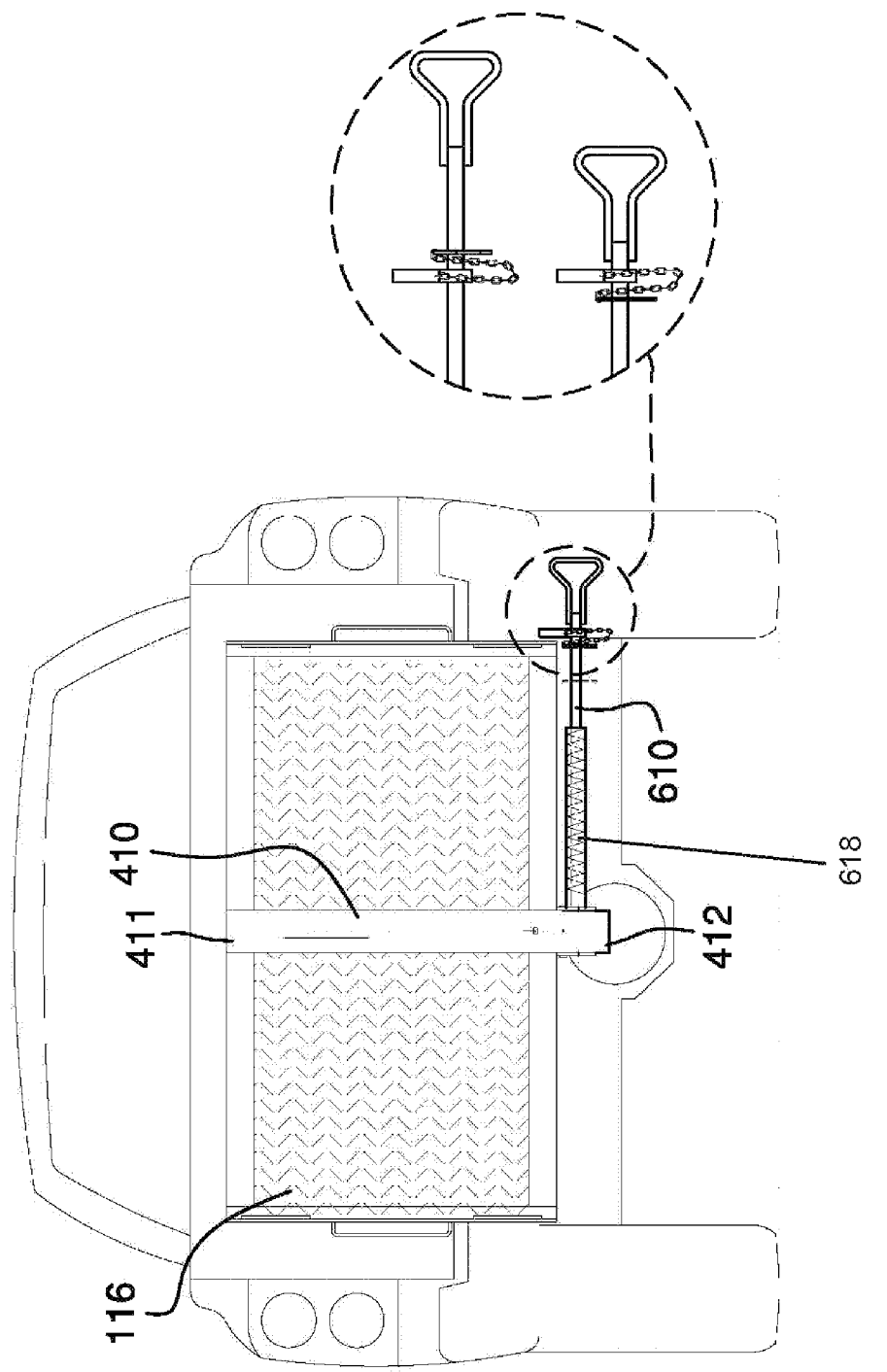
FIG. 6 is a rear in-use view of the system of the present invention.

The system 100 further comprises a hitch release 610 attached to the hitch tube 310 near the second end 312. The hitch release 610 is attached to the side surface of the hitch tube 310 as shown in FIG. 1. In some embodiments, the hitch release 610 comprises an inner shaft 610A telescopically received in an outer shaft 610B (e.g., the outer shaft 610B being attached to the hitch tube 310). In some embodiments, a hitch release handle 620 is disposed on the outer end 612 of the hitch release 610. As shown in FIG. 6, in some embodiments, a return spring 618 is disposed in the outer shaft 610B of the hitch release 610, wherein the inner shaft 610A presses against the return spring 618.

In some embodiments, one or more pin aperture 626 are disposed in the hitch, release 610, for example in the inner shaft 610.

In some embodiments, a hitch release mounting bracket 630 is disposed on the hitch release 610 at or near the outer end 612 (e.g., on the inner shaft 610A). In some embodiments, a chain 640 or rope is disposed on the hitch release mounting bracket 630 (one end of the chain 640 being a free end and one being attached to the hitch release mounting bracket 630). In some embodiments, a locking pin 638 is disposed on the free end of the chain 640. The locking pin 638 is adapted to be inserted in the pin apertures 626.

To use the system 100 of the present invention, the hitch tube 310 is engaged in the hitch receiver 360. The system is pivoted to one side. With the ramps 210 attached to the platform 110, the scooter 101 is directed up the ramps 210 and onto the platform 110. Then, the platform 110 can be pivoted to a horizontal state (e.g., by pivoting the base support tube 410 and hitch tube 310.)

As used herein, the term "about" refers to plus or minus 10% of the referenced number. For example, an embodiment wherein the hitch tube 310 is about 2 inches in diameter includes a hitch tube 310 that is between 1.8 and 2.2 inches in diameter.

The disclosures of the following U.S. Patents are incorporated in their entirety by reference herein: U.S. Pat. No. 5,011,361; U.S. Pat. No. 5,816,763; U.S. Pat. No. 5,853,278; U.S.

Design Pat. No. D435495; U.S. Pat. No. 6,253,981; U.S. Pat. No. 6,783,315; U.S. Pat. No. 6,887,027; U.S. Pat. No. 7,246,733; U.S. Pat. No. 7,316,339; U.S. Patent Application No. 2008/0044269.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. A carrier system (100) for transporting an electric scooter (101) behind a vehicle with a hitch receiver (630), said carrier system (100) comprising:
   (a) a base platform (110) having a first side edge (111), a second side edge (112) opposite the first side edge (111), a third side edge (113), a fourth side edge (114), a top surface (115) and a bottom surface (116);
   (b) an extension ramp (210) removably attached to the third side edge (113) of the base platform (110) at an angle with respect to the base platform (110) via a first attachment means;
   (c) a base support tube (410) having a first end (411) and a second end (412), the base platform (110) is mounted atop the base support tube (410) wherein the first end (411) of the base support tube (410) faces the first side edge (111) of the base platform (110) and the second end (412) of the base support tube (410) extends past the second side edge (112) of the base platform (110), the second end (412) of the base support tube (410) has a bottom surface and two side walls (413) and an open top surface, wherein a pair of lockdown pin holes (418) is disposed in the side walls (413) of the second end (412) of the base support tube (410), the lockdown pin holes (418) are adapted to accommodate a lockdown pin (518), a pair of side wall lips (414) extend upwardly from the side walls (413) of the second end (412) of the base support tube (410), a pair of pivot holes (416) is disposed in the side wall lips (414), the pivot holes (416) are adapted to accommodate a pivot bolt (516);
   (d) a hitch tube (310) having a first end (311), a second end (312), a top surface, a bottom surface (316), and side surfaces, the hitch tube (310) has a cylindrical cross section, the first end (311) of the hitch tube (310) is adapted to be telescopically received in a hitch receiver (360) of a vehicle, the second end (312) of the hitch tube (310) is adapted to be sandwiched between the side wall lips (414), a pair of pivot holes (416) is disposed in the second end (312) of the hitch tube (310), the pivot holes (416) in the hitch tube (310) align with the pivot holes (416) of the side wall lips (414) of the base support tube (410), the tubes (310), (410) can be secured together via a pivot bolt (516) in the pivot holes (416);
   (e) a lockdown pin flange (320) extending downwardly from the bottom surface (316) of the hitch tube (310) at the second end (312), the lockdown pin flange (320) is adapted to be sandwiched between the side walls (413) of the second end (412) of the base support tube (410), a pair of lockdown pin holes (418) is disposed in the lockdown pin flange (320) and the lockdown pin holes (418) in the lockdown pin flange (320) align with the lockdown pin holes (418) of the side walls (413) of the second end (412) of the base support tube (410), wherein when the hitch tube (310) is engaged with the base support tube (410) and the tubes (310), (410) are secured together via a pivot bolt (516), the base support tube (410) can pivot between a storage position wherein the base support tube (410) is pivoted to an angle of about 90 degrees with respect to the hitch tube (310) and an extended position wherein the base support tube (410) is positioned at an angle of about 180 degrees with respect to the hitch tube (310), wherein the hitch tube (310) can rotate in a first direction and a second direction within the hitch receiver (360) allowing the base platform (110) to effectively pivot;
   (f) a hitch stud (370) extending downwardly from a bottom surface (366) of an outer end (361) of the hitch receiver (360), the hitch stud (370) is adapted to be positioned in between the side walls (413) of the second end (412) of the base support tube (410) when the base support tube (410) is in the extended position, the hitch stud (370) functions to limit rotation of the hitch tube (310) in the first direction and in the second direction; and
   (g) a first lock pin hole (436A) disposed in the top surface of the hitch tube (310) at the second end (312) and a second lock pin hole (436B) disposed in a second lip (120B) of the platform (110), the lock pin holes (436) are adapted to receive a lock pin (536), wherein when the system is in the storage position the first and second lock pin holes (436) align.

2. The system (100) of claim 1 further comprising a first lip (120A) extending upwardly from the first side edge (111) of the base platform (110) and a second lip (120B) extending upwardly from the second side edge (112) of the base platform (110).

3. The system (100) of claim 2 further comprising a first rail (130A) extending upwardly from the first lip (120A) and a second rail (130B) extending upwardly from the second lip (120B).

4. The system (100) of claim 3, wherein the second rail (130B) is divided into a first half and a second half separated by a space.

5. The system (100) of claim 1 further comprising a third lip (120C) extending downwardly from the third side edge (113) of the base platform (110) and a fourth lip (120D) extending downwardly from the third side edge (113) of the base platform (110).

6. The system (100) of claim 1 further comprising a first handle (150A) disposed on the third side edge (113) of the base platform (110) or on a third lip (120C) extending downwardly from the third side edge (113) of the base platform (110), a second handle (150B) disposed on the fourth side edge (114) of the base platform (110) or on a fourth lip (120D) extending downwardly from the third side edge (113) of the base platform (110), or a combination thereof.

7. The system (100) of claim 1 further comprising a traction component (140) disposed on the top surface (115) of the base platform (110) for providing traction.

8. The system (100) of claim 7, wherein the traction component (140) comprises rubber footings, metal mesh, or a combination thereof.

9. The system (100) of claim 1, wherein first attachment means comprises a ramp slot (160) disposed in the base platform (110) at the third side edge (113) and a tab (218) disposed on an end of the extension ramp (210), wherein the tabs (218) removably engage the ramp slot (160) to attach the extension ramp (210) to the base platform (110).

10. The system (100) of claim 1 further comprising a storage clip (230) disposed on the top surface (115) of the base platform (110), the storage clip (230) removably engages the extension ramp (210) to secure the extension ramp atop the base platform (110) for storage purposes.

11. The system (100) of claim 1 further comprising a rotation stop block (380) disposed on each side of the hitch receiver (360) to help limit rotation of the hitch tube (310) within the hitch receiver (360).

12. A carrier system (100) for transporting an electric scooter (101) behind a vehicle with a hitch receiver (630), said carrier system (100) consisting of:
(a) a base platform (110) consisting of a first side edge (111), a second side edge (112) opposite the first side edge (110), a third side edge (113), a fourth side edge (114), a top surface (115) and a bottom surface (116);
(b) an extension ramp (210) removably attached to the third side edge (113) of the base platform (110) at an angle with respect to the base platform (110) via a first attachment means;
(c) a base support tube (410) consisting of a first end (411) and a second end (412), the base platform (110) is mounted atop the base support tube (410) wherein the first end (411) of the base support tube (410) faces the first side edge (111) of the base platform (110) and the second end (412) of the base support tube (410) extends past the second side edge (112) of the base platform (110), the second end (412) of the base support tube (410) has a bottom surface and two side walls (413) and an open top surface, wherein a pair of lockdown pin holes (418) is disposed in the side walls (413) of the second end (412) of the base support tube (410), the lockdown pin holes (418) are adapted to accommodate a lockdown pin (518), a pair of side wall lips (414) extend upwardly from the side walls (413) of the second end (412) of the base support tube (410), a pair of pivot holes (416) is disposed in the side wall lips (414), the pivot holes (416) are adapted to accommodate a pivot bolt (516);
(d) a hitch tube (310) consisting of a first end (311), a second end (312), a top surface, a bottom surface (316), and side surfaces, the hitch tube (310) has a cylindrical cross section, the first end (311) of the hitch tube (310) is adapted to be telescopically received in a hitch receiver (360) of a vehicle, the second end (312) of the hitch tube (310) is adapted to be sandwiched between the side wall lips (414), a pair of pivot holes (416) is disposed in the second end (312) of the hitch tube (310), the pivot holes (416) in the hitch tube (310) align with the pivot holes (416) of the side wall lips (414) of the base support tube (410), the tubes (310), (410) can be secured together via a pivot bolt (516) in the pivot holes (416);
(e) a lockdown pin flange (320) extending downwardly from the bottom surface (316) of the hitch tube (310) at the second end (312), the lockdown pin flange (320) is adapted to be sandwiched between the side walls (413) of the second end (412) of the base support tube (410), a pair of lockdown pin holes (418) is disposed in the lockdown pin flange (320) and the lockdown pin holes (418) in the lockdown pin flange (320) align with the lockdown pin holes (418) of the side walls (413) of the second end (412) of the base support tube (410), wherein when the hitch tube (310) is engaged with the base support tube (410) and the tubes (310), (410) are secured together via a pivot bolt (516), the base support tube (410) can pivot between a storage position wherein the base support tube (410) is pivoted to an angle of about 90 degrees with respect to the hitch tube (310) and an extended position wherein the base support tube (410) is positioned at an angle of about 180 degrees with respect to the hitch tube (310), wherein the hitch tube (310) can rotate in a first direction and a second direction within the hitch receiver (360) allowing the base platform (110) to effectively pivot;
(f) a hitch stud (370) extending downwardly from a bottom surface (366) of an outer end (361) of the hitch receiver (360), the hitch stud (370) is adapted to be positioned in between the side walls (413) of the second end (412) of the base support tube (410) when the base support tube (410) is in the extended position, the hitch stud (370) functions to limit rotation of the hitch tube (310) in the first direction and in the second direction; and
(g) a first lock pin hole (436A) disposed in the top surface of the hitch tube (310) at the second end (312) and a second lock pin hole (436B) disposed in a second lip (120B) of the platform (110), the lock pin holes (436) are adapted to receive a lock pin (536), wherein when the system is in the storage position the first and second lock pin holes (436) align.

* * * * *